F. F. GAINES.
CAR END CONSTRUCTION.
APPLICATION FILED AUG. 6, 1910.
996,074.
Patented June 27, 1911.
7 SHEETS—SHEET 1.
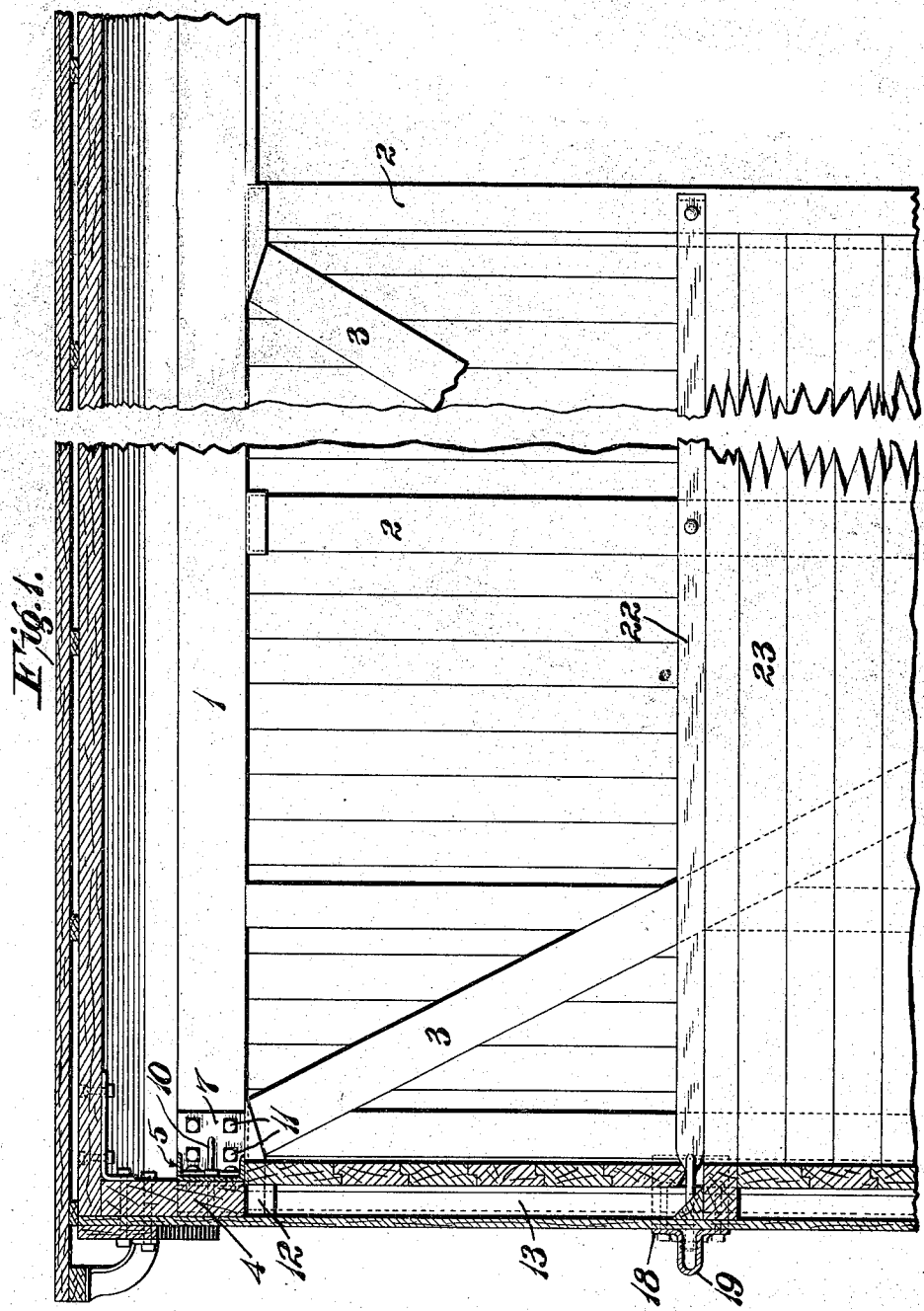

F. F. GAINES.
CAR END CONSTRUCTION.
APPLICATION FILED AUG. 6, 1910.
996,074.
Patented June 27, 1911.
7 SHEETS—SHEET 2.
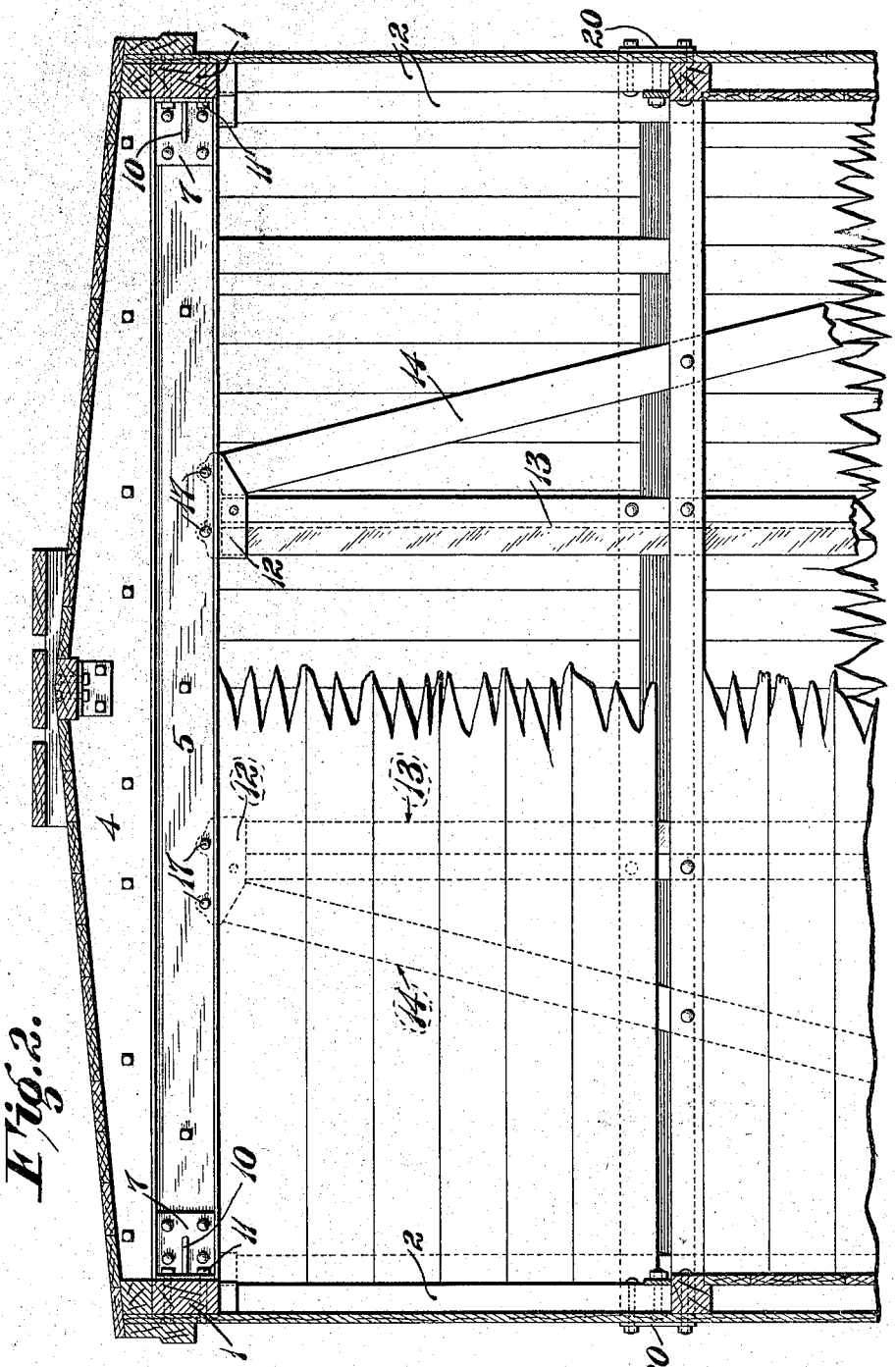

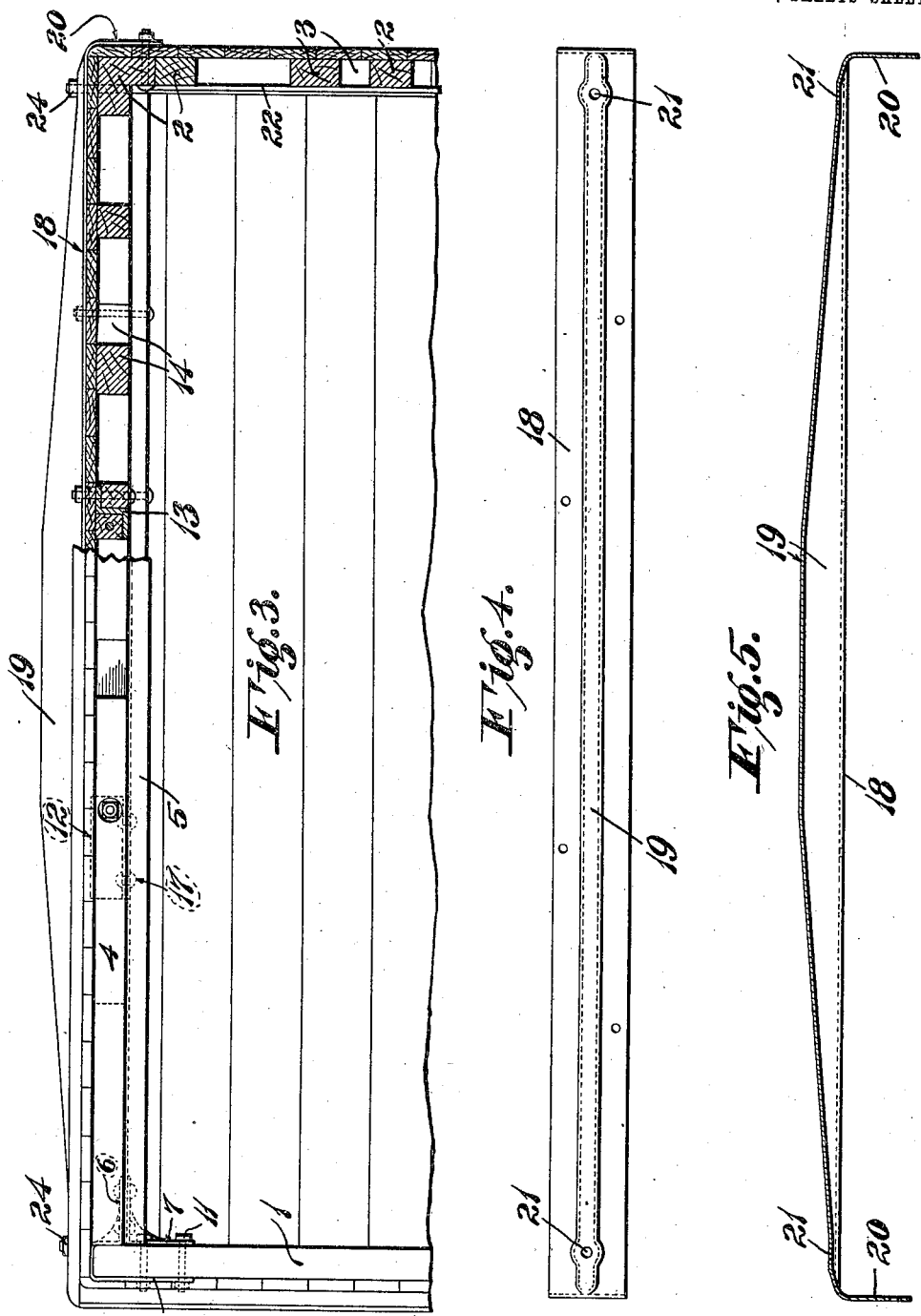

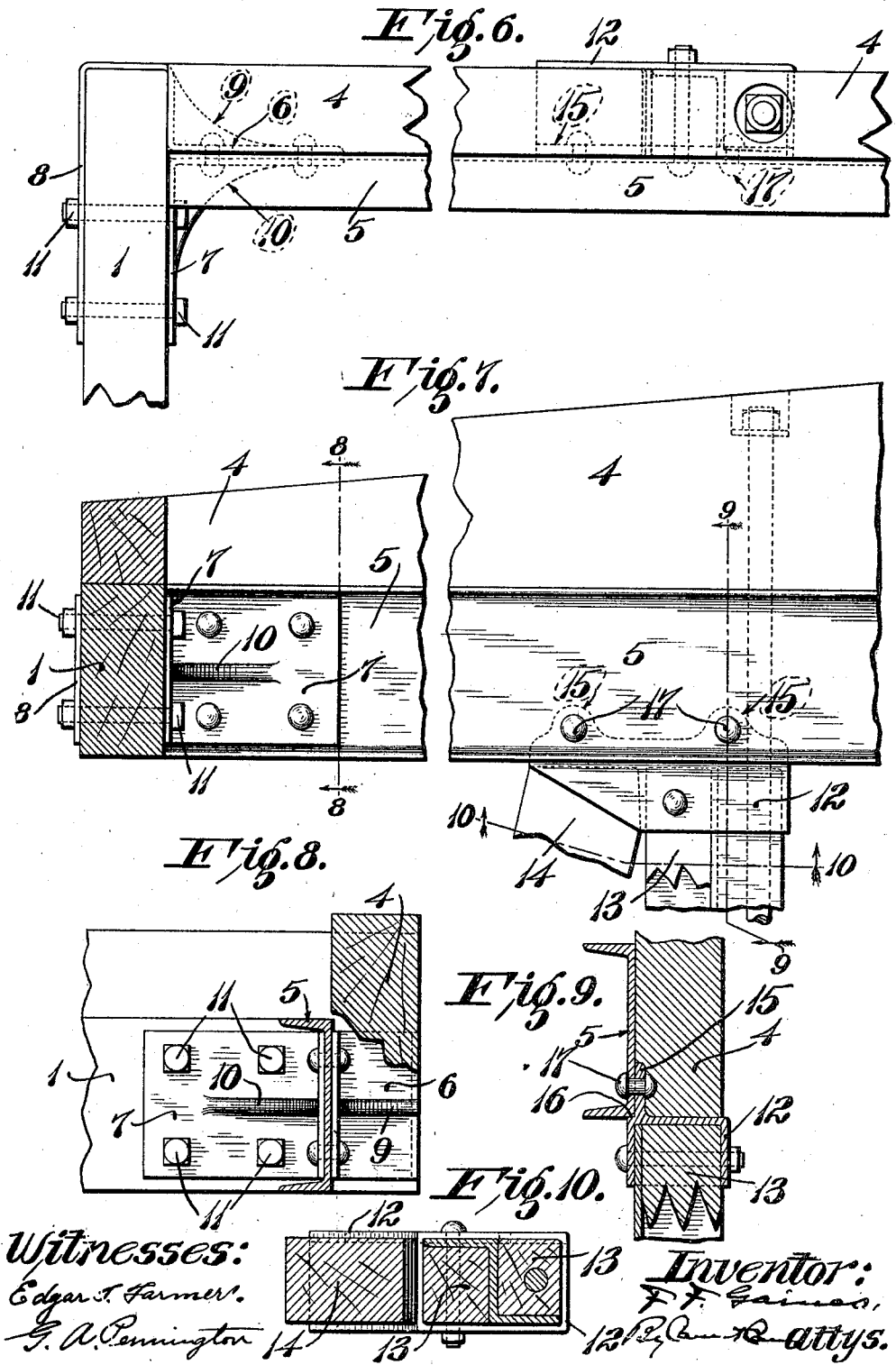

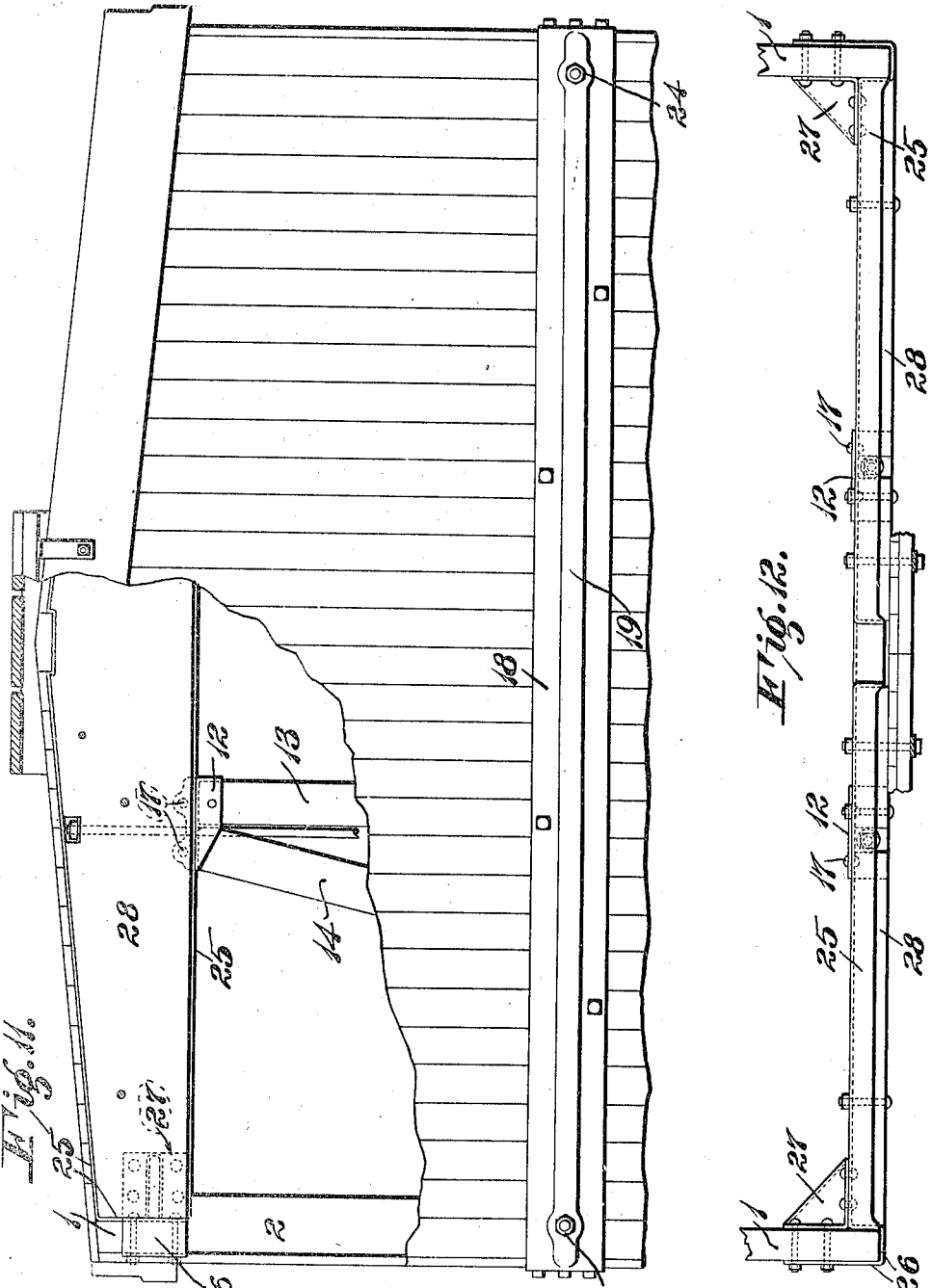

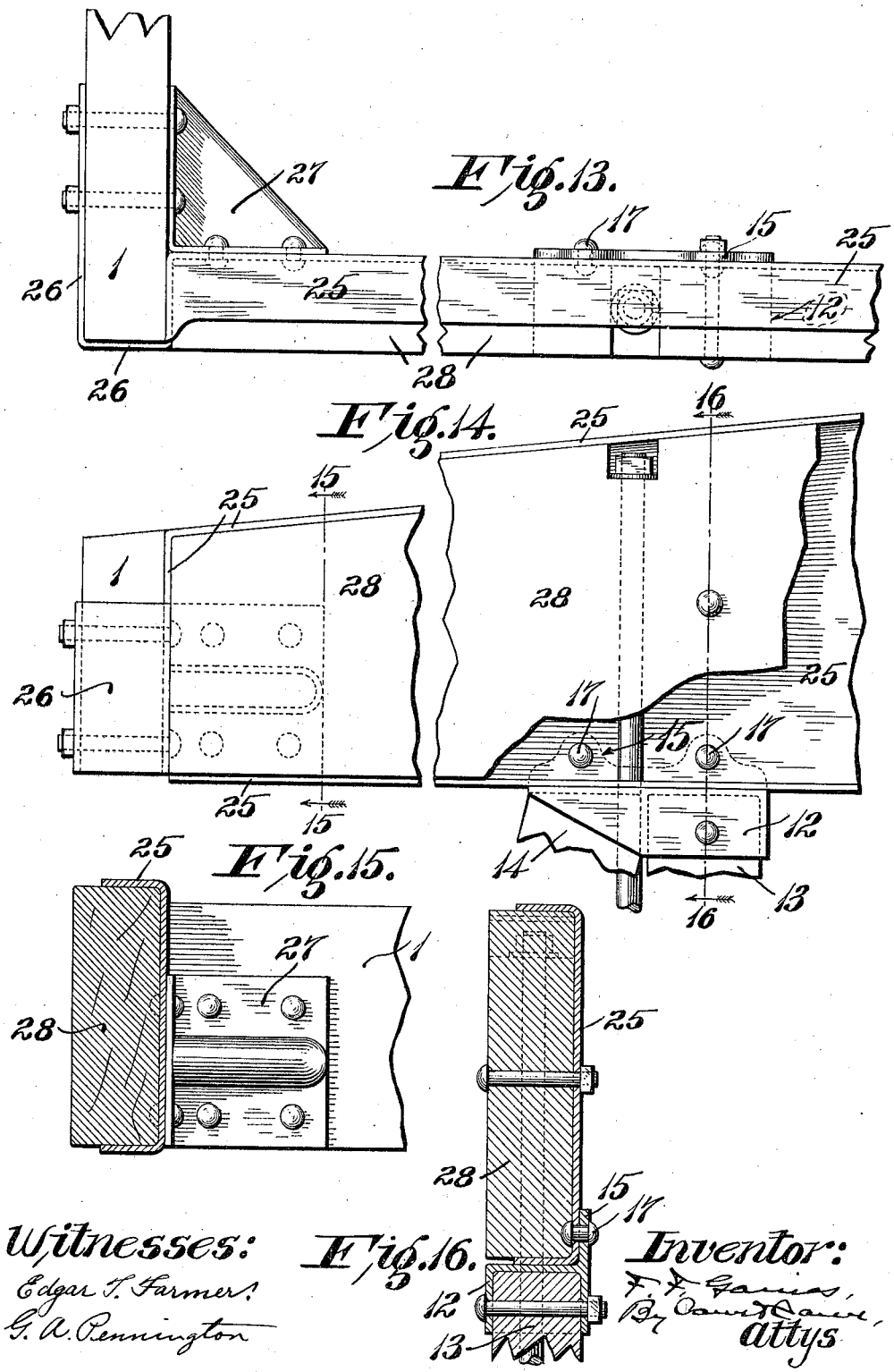

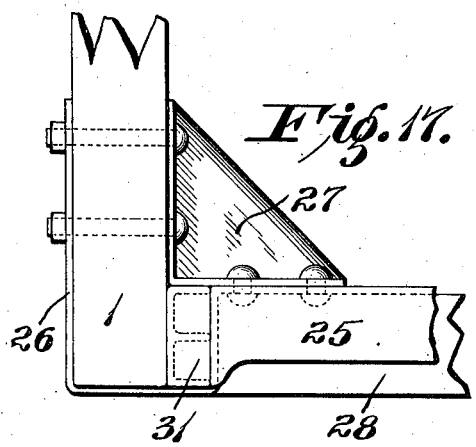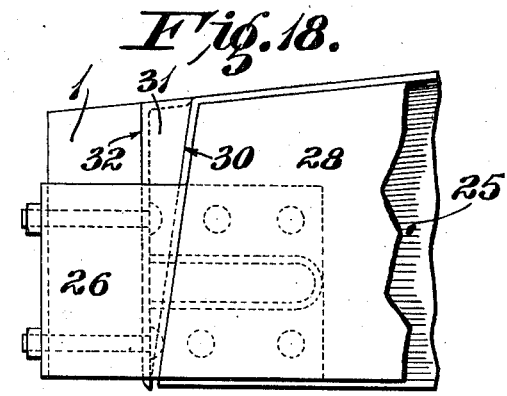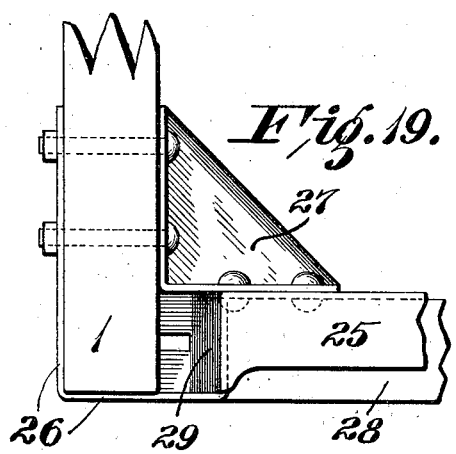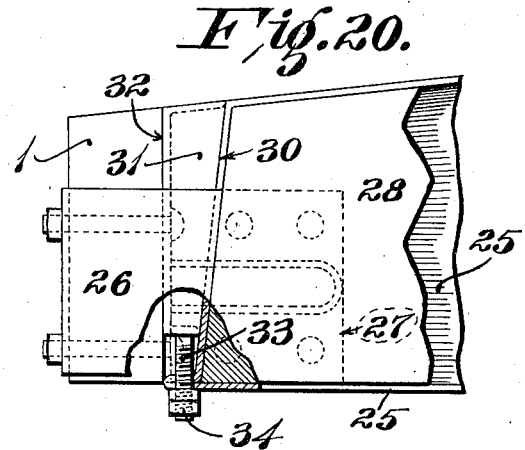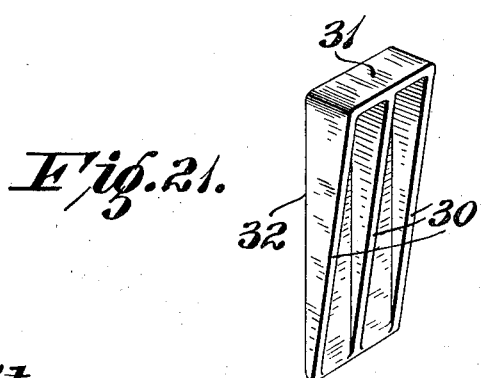

UNITED STATES PATENT OFFICE.

FREDERICK F. GAINES, OF SAVANNAH, GEORGIA, ASSIGNOR TO STANDARD RAILWAY EQUIPMENT COMPANY, OF EAST ST. LOUIS, ILLINOIS, A CORPORATION OF ILLINOIS.

CAR-END CONSTRUCTION.

996,074.   Specification of Letters Patent.   Patented June 27, 1911.

Application filed August 6, 1910. Serial No. 575,961.

*To all whom it may concern:*

Be it known that I, FREDERICK F. GAINES, a citizen of the United States, and a resident of the city of Savannah, in the county of Chatham and State of Georgia, have invented a new and useful Improvement in Car-End Constructions, of which the following is a specification.

This invention relates to car end constructions.

It has for its principal objects to stiffen the end frames without materially increasing the weight, to provide a metal end plate, to correlate the end plate with a tie-plate across the end of the car, to secure a rigid and durable connection between the end plates and side plates, and to attain certain other advantages hereinafter more fully appearing.

The invention consists in the parts and in the arrangements and combinations of parts hereinafter described and claimed.

In the accompanying drawings which form part of this specification and wherein like symbols refer to like parts wherever they occur, Figure 1 is a vertical longitudinal section through the upper and end portion of a freight car constructed according to my invention; Fig. 2 is a vertical transverse section through the car body adjacent to the end wall, portions of the inside lining of the end wall being removed; Fig. 3 is a fragmentary view, partly in top plan and partly in horizontal section, of the end portion of the car with the roof removed; Fig. 4 is an outside face view of the pressed steel tie-plate or strap for the end of the car; Fig. 5 is a horizontal longitudinal section through the tie-plate or strap; Fig. 6 is a fragmentary top plan view, on an enlarged scale, of one corner portion of the car frame with the roof removed to show the details of the connection between the end plate and side plate; Fig. 7 is a transverse vertical section through the side plate, and an inside face view of the portions of the end plate as shown in Fig. 6; Fig. 8 is a fragmentary section on the line 8—8 of Fig. 7; Fig. 9 is a fragmentary section on the line 9—9 of Fig. 7; Fig. 10 is a section on the line 10—10 of Fig. 7; Fig. 11 is a fragmentary end elevation of the upper portion of a car body equipped with a modified construction of end plate, portions of the sheathing being broken away to disclose the end plate construction; Fig. 12 is a top plan view of the end plate shown in Fig. 11; Fig. 13 is a fragmentary plan view, on an enlarged scale, showing the details of the end plate illustrated in Figs. 11 and 12, and manner of connecting same to the side plate; Fig. 14 is an end view of the side plate and an outside face view of the end plate construction shown in Fig. 13; Fig. 15 is a section on the line 15—15 of Fig. 14; Fig. 16 is a section on the line 16—16 of Fig. 14; Fig. 17 is a fragmentary top plan view showing a gravitating wedge for taking up the looseness between the end plate and side plate due to the shrinkage of the latter; Fig. 18 is a fragmentary view showing the sideplate in end elevation and the end plate and tightening wedge being also shown in elevation; Fig. 19 is a fragmentary top plan view of the end plate and side plate with the tightening wedge removed, and showing the end plate arranged for a modification of the tightening wedge; Fig. 20 is an elevation of the end-plate and side plate, showing a modified construction and arrangement of tightening wedge; and Fig. 21 is a perspective view of a tightening wedge detached.

The side framing and end framing of the car body below the side plates and end plates, respectively, may be of any suitable construction. As illustrated, the side plates 1 are mounted on posts 2 and diagonal braces 3.

As shown in Figs. 1 to 9, inclusive, the end plate comprises a wooden member 4 which has a metal channel member 5 bolted to its inner face along the lower portion thereof. Secured to the opposite faces of the web portion of the channel member 5, at the opposite ends thereof, are connecting brackets or members 6, 7, respectively, which are bolted to the side plates so as to form a rigid connection between the side plates and end plate. These members may be either malleable castings, forgings or pressed steel, as desirable. The connecting member 6 is riveted to the outer face of the web of the channel member 5 and is extended around the end and then rebent back against the outer face of the side plate as at 8. The angular portion between the side plate and end plate is preferably stiffened by a rib 9 which is fitted into a groove provided therefor in the end portion of the wooden member 4. The connecting member 7 is in the form of a right angular bracket and one leg thereof is riveted to the inner face of the web of the channel member 5 while its opposite leg is bolted to the inner face of the side plate 1. This connecting member 7 is also preferably provided with a stiffening rib 10. The securing bolts 11 are passed through the side plate and alining perforations in the respective coöperating connecting members 6, 7. Riveted to the channel member 5 of the end plate are castings or other suitable members 12 which are provided with pockets for the end posts 13 and diagonal braces 14. As shown more clearly in Figs. 6 to 10, inclusive, these pocket members 12 are provided with vertical flanges or ears 15 which are riveted to the outer face of the web of the channel member 5 and let into a grooved portion in the inner face of the wooden member 4. The flanges or ears 15 are preferably set inwardly a slight distance from the marginal portion of the member 12 so as to provide a shoulder 16 which fits against the under side of the channel member 5 and thereby relieves the strain on the securing rivets 17. Fastened across the outer face of the end wall of the car, preferably a slight distance above the middle thereof, is a metal tie-plate or strap 18. This strap 18 is preferably a pressed steel member which is grooved longitudinally to provide an outwardly projecting stiffening rib 19 throughout its length. The opposite ends 20 of the plate or strap 18 are bent around and secured to the outer side of the opposite side walls of the car as more clearly shown in Figs. 3 to 5, inclusive. Near its opposite ends, the tie-plate is provided with perforations 21 through which are inserted the end portions of longitudinal tie-rods or straps 22 which are secured to the side posts of the car frame at the top of the inside lining 23, or at the proper height. The tie-rods or straps 22 are provided with nuts 24 or other suitable securing devices on their outer ends, and their inner ends are preferably connected to the respective door posts.

Referring now to Figs. 11 to 16, inclusive, the end plate comprises a pressed steel member 25 which is flanged outwardly at its top and bottom edge portions and at its ends; and the web portion at its ends is extended around the end of the side plate, as at 26, and bolted to the outer face of the latter. Preferably, one leg of pressed steel or cast malleable corner pieces 27 are riveted to the inner face of the web of the pressed steel end plate member 25 and their opposite legs are bolted to the inner faces of the respective side plates.

As shown in Figs. 11 to 16, inclusive, a wooden filler 28 is bolted to the pressed steel end plate member 25; but, obviously, the wooden filler may be dispensed with in some cases whether the end plate be of the pressed steel construction or the structural steel construction comprising the channel member.

A shown in Figs. 17 to 21, inclusive, shrinkage wedges may be provided between the adjacent ends of the end plates and the side plates of the car. These may be either arranged as automatically-acting gravitating wedges, which are adapted to take up the looseness due to the shrinking of the wooden side plates, or the wedges may be arranged and adapted to be driven through some mechanical means to take up such looseness.

As shown in Figs. 17 and 18, the end of the metal end plate 25 is recessed vertically and provided with an inclined face which coöperates with the counterpart inclined face 30 of the wedge 31 whose opposite face 32 lies flat against the inner face of the side plate.

As shown in Figs. 19 and 20, the tightening wedge is provided at its lower end with a screw-threaded stem or shank 33 which is fitted through a slot in the end plate and provided with a nut or lock nuts 34 arranged to bear against the under side of the end plate and draw the wedge downwardly when said nuts are screwed inwardly on the stem.

Obviously there are numerous constructions and arrangements which may be adapted for the wedge; and it is also obvious that the general construction and arrangement of the side plates and end plates admits of considerable modification without departing from my invention. Therefore, I do not wish to be limited to the specific construction and arrangement shown.

What I claim is:

1. A car end construction comprising, in combination, the side plates, and an end plate comprising a metal beam whose web portion is disposed vertically and top and bottom marginal portions are flanged, and means rigidly connecting the opposite end portions of said metal beam to the respective side plates.

2. A car end construction comprising, in combination, the side plates, and a metal end plate, said metal end plate comprising a beam whose web portion is disposed vertically and flanged at its top and bottom edge portions, and connecting members rigidly secured to the opposite ends of said metal beam and to the respective side plates.

3. A car end construction comprising, in combination, the side plates, and a metal end plate, said end plate comprising a beam whose web portion is disposed vertically and marginal portion is flanged substantially at right angles to the web portion, right angular connecting members having one of their legs rigidly secured to the end portion of the web of said metal beam and their opposite legs secured to the inner faces of the respective side plates, and additional connecting members secured to the opposite end portions of the vertical web of said metal beam, said second mentioned connecting members being extended around the ends of the respective side plates and bent back and secured against the outer faces of the latter.

4. A car end construction comprising, in combination, the side plates, and an end plate, said end plate comprising a wooden member which extends from side plate to side plate, a metal beam secured to the inner face of said wooden member and extending from side plate to side plate, said metal beam having a substantially vertical web portion and flanged top and bottom marginal portions, and means rigidly connecting the opposite ends of said metal beam to the respective side plates.

5. A car end construction comprising, in combination, the side plates, a metal end plate extending from side plate to side plate and rigidly connected at its opposite ends to the respective side plates, said metal end plate having a substantially vertical web portion and flanged top and bottom marginal portions, and a metal tie-plate secured transversely across the outside of the end wall of the car, said tie-plate being stiffened substantially throughout its length and rigidly connected to the end framing of the car and having its opposite end portions bent back and secured to the outer faces of the opposite side walls of the car.

6. A car end construction comprising, in combination, the side plates, a metal end plate extending from side plate to side plate and having its web portion disposed vertically, its top and bottom marginal portions flanged, and its opposite end portions bent around and rigidly secured to the respective side plates, and a rigid metal tie-plate secured transversely across the end of the car in correlation to the end plate.

7. A car end construction comprising, in combination, the side plates, a rigid metal end plate extending from side plate to side plate and having its opposite end portions bent around and rigidly secured to the respective side plates, and a rigid metal tie-plate secured transversely across the end of the car, below said end plate, but above the middle of the end wall and correlated with said end plate.

8. A car end construction comprising, in combination, the side plates, a metal end plate extending from side plate to side plate and rigidly connected at its opposite ends to the respective side plates, and means for taking up the looseness due to the shrinkage of the side plates, so that the rigidity of the structure is maintained.

9. A car end construction comprising, in combination, the side plates, an end plate whose opposite end portions are rigidly connected to the respective side plates, and a device located between the end of the end plate and adjacent side plate for taking up the looseness due to the shrinkage of the side plates, so that the rigidity of the structure is maintained.

10. A car end construction comprising, in combination, the side plates, an end plate whose end portions are rigidly connected to the respective side plates, and an automatically-acting device arranged and adapted to take up the looseness due to the shrinkage of the side plates, so that the rigidity of the structure is maintained.

11. A car end construction comprising, in combination, the side plates, an end plate whose opposite end portions are rigidly connected to the respective side plates, and a wedge mounted between the end of the end plate and inner face of the adjacent side plate so as to take up the looseness due to the shrinkage of the latter.

12. A car end construction comprising, in combination, the side plates, a metal end plate, and connecting members secured to the opposite ends of said metal end plate so as to abut against the inner face of and being bent around the adjacent side plate and secured to the outer face thereof.

13. A car end construction comprising, in combination, the side plates, a metal end plate, connecting members secured to the opposite ends of said metal end plate and bent around the adjacent side plate and secured to the outer face of the latter, and a tightening wedge located between the end of the end plate and inner face of the adjacent side plate so as to take up the looseness due to the shrinkage of the side plate.

14. A car end construction comprising, in combination, the side plates, a metal end plate whose opposite end portions are rigidly connected to the respective side plates, the top and bottom marginal portions of said end plate being flanged at substantially right angles to the body portion thereof, and metal pocket members fitted against the under side of said end plate and riveted to the vertical web portion thereof.

15. A car end construction comprising, in combination, the side plates, an end plate comprising a wooden member, a metal channel member secured to the inner face of said wooden member along the lower portion thereof, connecting members rigidly secured to said metal channel member and to the adjacent side plate, and metal pocket members fitted against the under side of said wooden member and having upstanding portions which are riveted to the web portions of the channel member.

16. A car end construction comprising, in combination, the side plates, a metal end plate whose opposite end portions are rigidly connected to the respective side plates, metal pocket members rigidly secured to the metal end plate and adapted to receive the respective posts and braces of the end framing of the car body, and a metal tie-plate extending transversely across the end wall of the car and secured to the end framing.

17. In a car end construction, the combination with the side plates, of a pressed steel end plate whose top and bottom marginal portions are flanged, the opposite end portions of said end plate being bent over the respective side plates and secured to the outer faces thereof, and connecting members rigidly secured to the opposite end portions of said end plate and to the inner faces of the respective side plates.

18. In a car end construction, the combination with the side plates, of a pressed steel end plate whose top and bottom marginal portions are flanged outwardly, the opposite end portions of said pressed steel end plate being extended around the ends of the respective side plates and bent back and secured to the outer faces of the latter, connecting members rigidly secured to the opposite end portions of said pressed steel end plate and to the inner faces of the respective side plates, and a wooden filler secured to the channel side of said pressed steel end plate.

19. In a car end construction, the combination with the side plates, of a pressed steel end plate whose top and bottom marginal portions are flanged, and the opposite end portions of said end plate being rigidly secured to the respective side plates.

20. In a car end construction, the combination with the side plates, of an end plate comprising a wooden member which extends from side plate to side plate, and a metal channel member secured to the inner face of said wooden member with its flanged portions disposed inwardly, and connecting members rigidly secured to said channel member and to the respective side plates.

21. In a car end construction, the combination with the side plates, an end plate comprising a wooden member which extends from side plate to side plate, a metal channel member secured to the inner face of said wooden member with its flanged portions disposed inwardly, substantially right angular connecting members having one of their legs secured to the end portion of the web of said channel member and their opposite legs secured to the inner faces of the respective side plates, and additional connecting members rigidly secured to the opposite end portions of the web of said channel member, and extending around the ends of the respective side plates and secured to the uter face of the latter.

Signed at Savannah, Georgia, this 1st day of August 1910.

FREDERICK F. GAINES.

Witnesses:
J. R. KOERPED,
J. G. KELLAM.